United States Patent
Yoda

(10) Patent No.: US 9,227,143 B2
(45) Date of Patent: Jan. 5, 2016

(54) GAME CONTROL SERVER APPARATUS

(71) Applicant: DeNA Co., Ltd., Tokyo (JP)

(72) Inventor: Takuro Yoda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/565,709

(22) Filed: Dec. 10, 2014

(65) Prior Publication Data

US 2015/0157937 A1 Jun. 11, 2015

(30) Foreign Application Priority Data

Dec. 11, 2013 (JP) .................................. 2013-256501

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/35 | (2014.01) |
| A63F 13/63 | (2014.01) |

(52) U.S. Cl.
CPC ................. *A63F 13/35* (2014.09); *A63F 13/63* (2014.09)

(58) Field of Classification Search
USPC ....................... 463/6, 7, 23, 30, 39, 41, 42, 43
See application file for complete search history.

(56) References Cited

U.S. PATENT DOCUMENTS

| | | | |
|---|---|---|---|
| 6,251,012 B1 * | 6/2001 | Horigami et al. ................. | 463/7 |
| 8,585,508 B1 | 11/2013 | Takagi et al. | |
| 2002/0082065 A1 * | 6/2002 | Fogel et al. ........................ | 463/8 |
| 2006/0116186 A1 * | 6/2006 | Sawada et al. .................... | 463/4 |
| 2007/0129148 A1 * | 6/2007 | Van Luchene .................. | 463/42 |
| 2007/0197276 A1 * | 8/2007 | Sato ................................ | 463/16 |
| 2007/0238499 A1 * | 10/2007 | Wright .............................. | 463/1 |
| 2015/0151204 A1 * | 6/2015 | Yamaguchi et al. ............ | 463/42 |

FOREIGN PATENT DOCUMENTS

| | | |
|---|---|---|
| JP | 2004-073681 | 3/2004 |
| JP | 5204330 | 6/2013 |

\* cited by examiner

*Primary Examiner* — Adetokunobo O Torimiro
(74) *Attorney, Agent, or Firm* — IPUSA, PLLC

(57) ABSTRACT

A game control server apparatus includes an evolution information storing unit that stores a base character, a partner character and an evolved character associated with each other, the base character being converted to the evolved character by combining the base character and the partner character; and an evolution process management unit that coverts, upon accepting an evolution instruction of a base character possessed by a first player by combining the base character and a partner character possessed by another second player to evolve the base character from the first player, the base character to an evolved character that is associated with the base character and the partner character using the partner character of the second player under a condition that a process of paying reward from the first player to the second player is performed.

17 Claims, 14 Drawing Sheets

FIG.5

| PLAYER ID | STATUS | ICON DATA | PLAYER NAME | CURRENCY IN GAME | FRIEND PLAYER ID | POSSESSING CHARACTER ID | POSSESSING ITEM ID |
|---|---|---|---|---|---|---|---|
| p001 | 16 | image_p001 | AAA | 500 | p002, p010,··· | BS001, PC010,··· | item1,··· |
| p002 | 10 | image_p002 | BBB | 200 | p001,··· | PC010, PC020,··· | Item2,··· |
| ·· | ·· | ·· | ·· | ·· | ·· | ·· | ·· |
| p010 | 20 | image_p010 | CCC | 100 | p001,··· | PC011,··· | item1,··· |
| ·· | ·· | ·· | ·· | ·· | ·· | ·· | ·· |

| CHARACTER ID | ICON DATA | CHARACTER NAME | UPPER LIMITATION VALUE OF LEVEL | RARE DEGREE | |
|---|---|---|---|---|---|
| BS001 | image_BS001 | a | 10 | NORMAL | ... |
| BS002 | image_BS002 | b | 10 | NORMAL | ... |
| ... | ... | ... | ... | ... | ... |
| PC010 | image_PC010 | c | 5 | NORMAL | ... |
| PC011 | image_PC011 | d | 10 | HIGH | ... |
| PC020 | image_PC020 | e | 20 | NORMAL | ... |
| EV010 | image_EV010 | f | 100 | NORMAL | ... |
| EV011 | image_EV011 | g | 300 | HIGH | ... |
| ... | ... | ... | ... | ... | ... |
| EV020 | image_EV020 | h | 200 | NORMAL | ... |
| ... | ... | ... | ... | ... | ... |

| BASE CHARACTER ID | PARTNER CHARACTER | | EVOLVED CHARACTER ID |
|---|---|---|---|
| | ID | NECESSARY CURRENCY IN GAME | |
| BS001 | PC010 | 20 | EV010 |
| | PC011 | 40 | EV011 |
| | ⋮ | ⋮ | ⋮ |
| BS002 | PC020 | 10 | EV020 |
| | ⋮ | ⋮ | ⋮ |
| ⋮ | ⋮ | ⋮ | ⋮ |

| BASE CHARACTER | | PARTNER CHARACTER | | EVOLVED CHARACTER ID | ⋮ |
|---|---|---|---|---|---|
| ID | WINNING PERCENTAGE | ID | NECESSARY CURRENCY IN GAME | | |
| BS001 | LESS THAN 30% | PC010 | 20 | EV010 | ⋮ |
| | MORE THAN OR EQUAL TO 30% | | 20 | EV011 | ⋮ |
| ⋮ | | | | ⋮ | ⋮ |

| BASE CHARACTER | | PARTNER CHARACTER | | EVOLVED CHARACTER ID | ⋮ |
|---|---|---|---|---|---|
| ID | WINNING PERCENTAGE | ID | NECESSARY CURRENCY IN GAME | | |
| BS001 | LESS THAN 30% | PC011 | 40 | EV010 | ⋮ |
| | MORE THAN OR EQUAL TO 30% | PC010 | 20 | | ⋮ |
| ⋮ | | | | ⋮ | ⋮ |

| BASE CHARACTER | | PARTNER CHARACTER | | EVOLVED CHARACTER ID |
|---|---|---|---|---|
| ID | WINNING PERCENTAGE | ID | NECESSARY CURRENCY IN GAME | |
| BS001 | LESS THAN 30% | PC012 | 20 | EV012 |
| | MORE THAN OR EQUAL TO 30% | PC013 | 20 | EV013 |
| ⋮ | ⋮ | ⋮ | ⋮ | ⋮ |

| BASE CHARACTER ID | PARTNER CHARACTER | | | EVOLVED CHARACTER ID |
|---|---|---|---|---|
| | ID | WINNING PERCENTAGE | NECESSARY CURRENCY IN GAME | |
| BS001 | PC010 | LESS THAN 30% | 20 | EV010 |
| | | MORE THAN OR EQUAL TO 30% | 25 | EV011 |
| ⋮ | ⋮ | ⋮ | ⋮ | ⋮ |

| BASE CHARACTER ID | PARTNER CHARACTER | | EVOLUTION MATERIAL ID | EVOLVED CHARACTER ID | |
| --- | --- | --- | --- | --- | --- |
| | ID | NECESSARY CURRENCY IN GAME | | | 62 |
| BS001 | PC010 | 20 | item1 | EV010 | ... |
| | PC011 | 40 | item2 | EV011 | ... |
| | .. | .. | .. | .. | ... |
| BS002 | PC020 | 10 | item3 | EV020 | ... |
| | .. | .. | .. | .. | ... |
| .. | .. | .. | .. | .. | ... |

GAME CONTROL SERVER APPARATUS

CROSS-REFERENCE TO RELATED APPLICATION

The present application is based on and claims the benefit of priority of Japanese Priority Application No. 2013-256501 filed on Dec. 11, 2013, the entire contents of which are hereby incorporated by reference.

BACKGROUND OF THE INVENTION

1. Field of the Invention

The present invention relates to a game control server apparatus.

2. Description of the Related Art

Conventionally, there is a game in which a character is combined with another character to be converted to a new character. Patent Document 1 discloses a technique in which a character that satisfies a predetermined condition is formed into a seed, and then a new character is generated by combining seeds.

Patent Document 2 discloses a technique in which an upper limitation value of level of a game card is increased (evolved) by combining game cards (game media) of the same kind.

However, conventionally, a user cannot convert a character or the like if the user does not have a character or the like to combine with. Thus, when a character or the like that is necessary for conversion is difficult to obtain, a burden for players is heavy. Further, conventionally, there is a room for improvement in activating communication between players.

PATENT DOCUMENTS

[Patent Document 1] Japanese Laid-open Patent Publication No. 2004-73681

[Patent Document 2] Japanese Patent No. 5,204,330

SUMMARY OF THE INVENTION

The present invention is made in light of the above problems, and provides a technique in which flexibility is increased when converting a character by combining with another character and communication between players can be activated.

According to an embodiment, there is provided a game control server apparatus connected to a plurality of terminal devices of a plurality of players via a network, including a player information storing unit that stores information of characters possessed by each of the players; an evolution information storing unit that stores a base character, a partner character and an evolved character associated with each other, the base character being converted to the evolved character by combining the base character and the partner character; and an evolution process management unit that coverts, upon accepting an evolution instruction of a base character possessed by a first player by combining the base character and a partner character possessed by another second player to evolve the base character from the first player, the base character to an evolved character that is associated with the base character and the partner character using the partner character of the second player under a condition that a process of paying reward from the first player to the second player is performed.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of an internal structure of a player information storing unit of the embodiment;

FIG. 6 is a view illustrating an example of an internal structure of a character information storing unit of the embodiment;

FIG. 7 is a view illustrating an example of an internal structure of an evolution information storing unit of the embodiment;

FIG. 12 is a view illustrating another example of the internal structure of the evolution information storing unit of the embodiment;

FIG. 13 is a view illustrating another example of the internal structure of the evolution information storing unit of the embodiment;

FIG. 14 is a view illustrating another example of the internal structure of the evolution information storing unit of the embodiment;

FIG. 15 is a view illustrating another example of the internal structure of the evolution information storing unit of the embodiment; and FIG. 16 is a view illustrating another example of the internal structure of the evolution information storing unit of the embodiment.

DETAILED DESCRIPTION OF THE PREFERRED EMBODIMENTS

Figure 1:
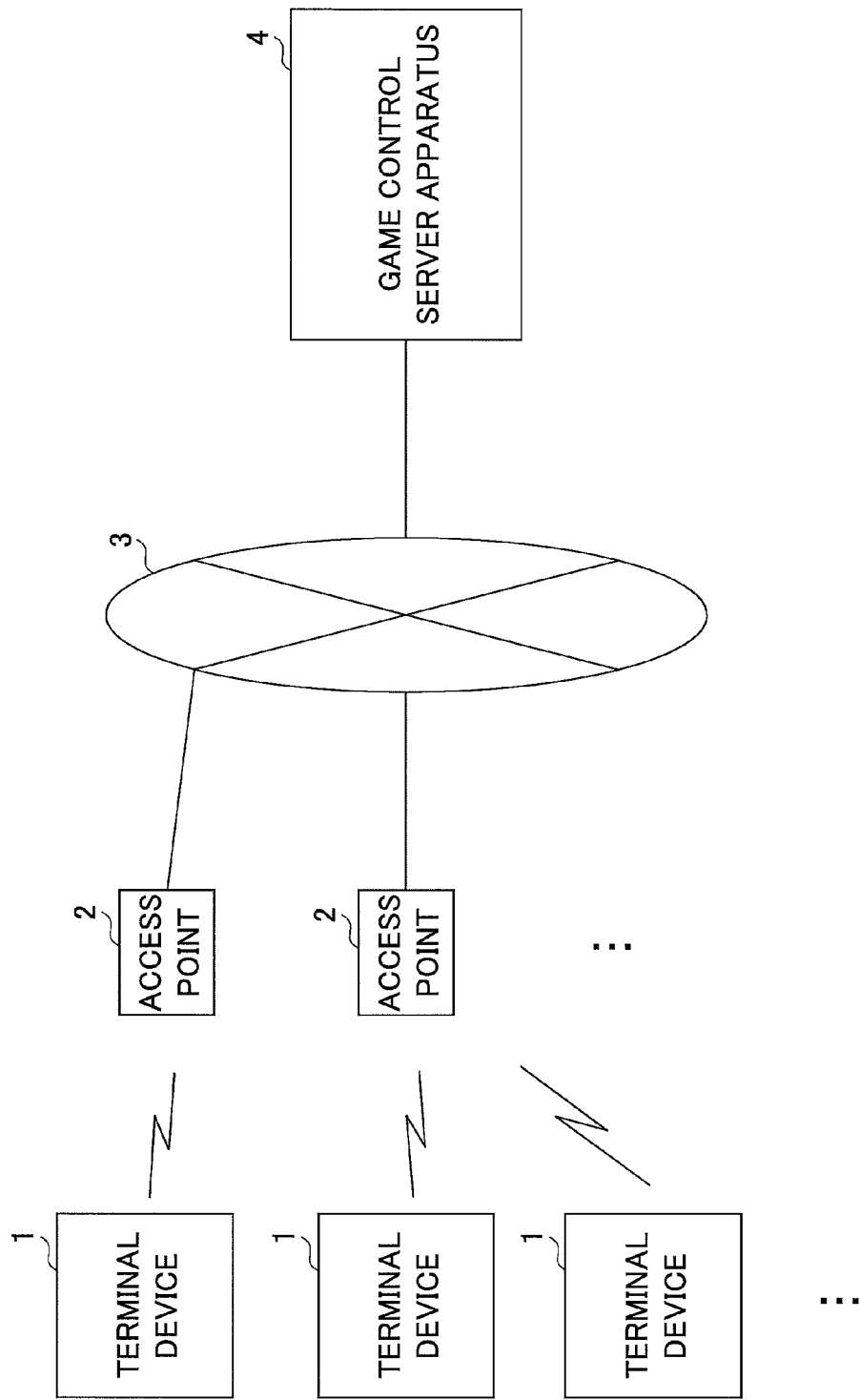
FIG. 1 is a block diagram illustrating an example of a system structure of the embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 1 is a block diagram illustrating an example of a system structure of the embodiment.

The system includes a plurality of terminal devices 1 each possessed by a player (user), access points 2 such as a mobile station, a Wi-Fi station or the like, a network 3 such as the INTERNET or the like and a game control server apparatus 4 that manages (controls) a game played by the plurality of players via the network 3. The game control server apparatus 4 is connected to the terminal devices 1 of the plurality of players via the network 3. The terminal device 1 may be a data processing apparatus such as a mobile phone, a smartphone, a game console, a personal computer, a touch pad, a digital book reader or the like.

Figure 2:
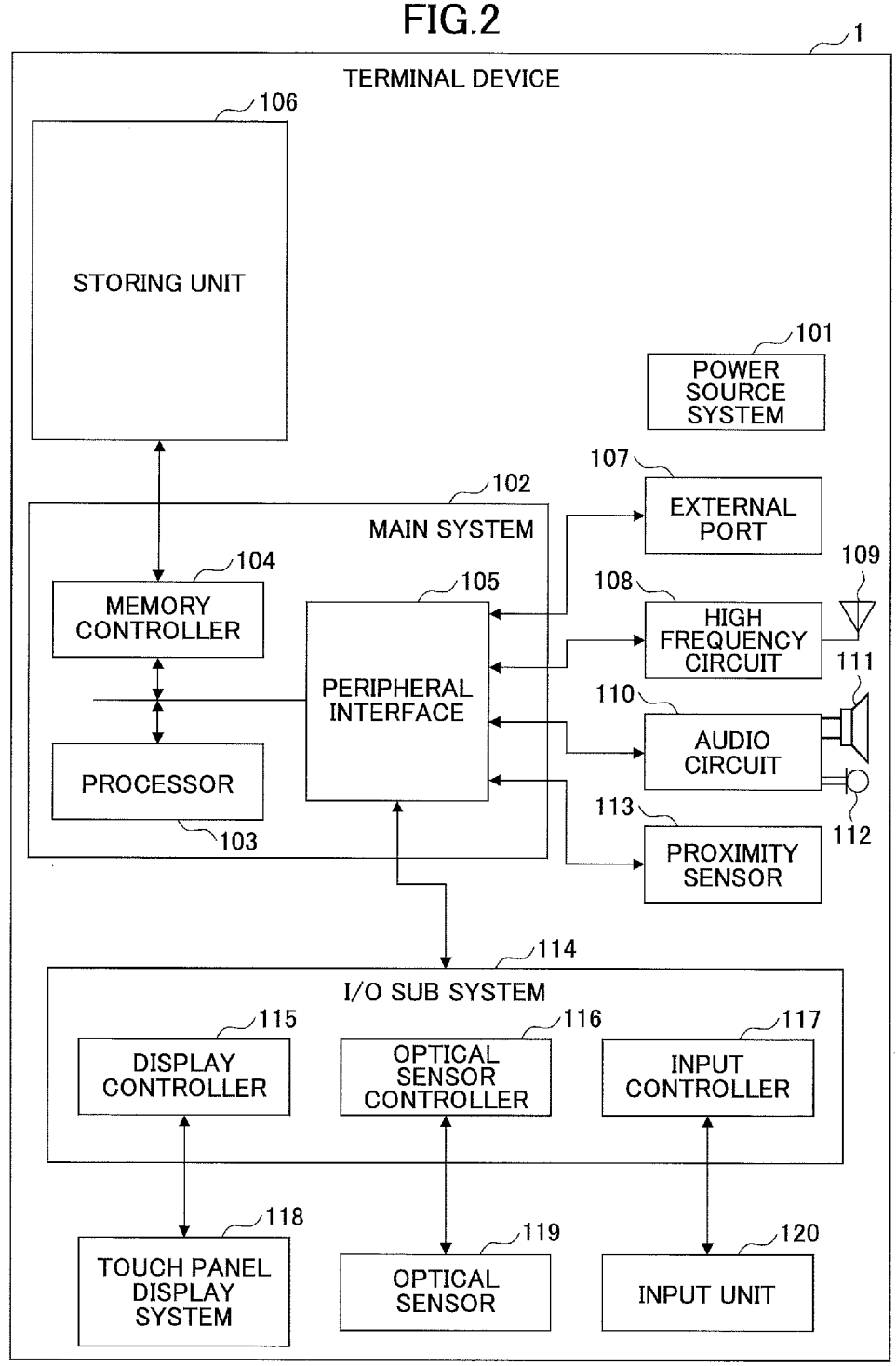
FIG. 2 is a block diagram illustrating an example of a hardware structure of a terminal device of the embodiment.

FIG. 2 is a block diagram illustrating an example of a hardware structure of the terminal device 1 of the embodiment.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O (Input/Output) sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116 and an input controller 117.

Figure 3:
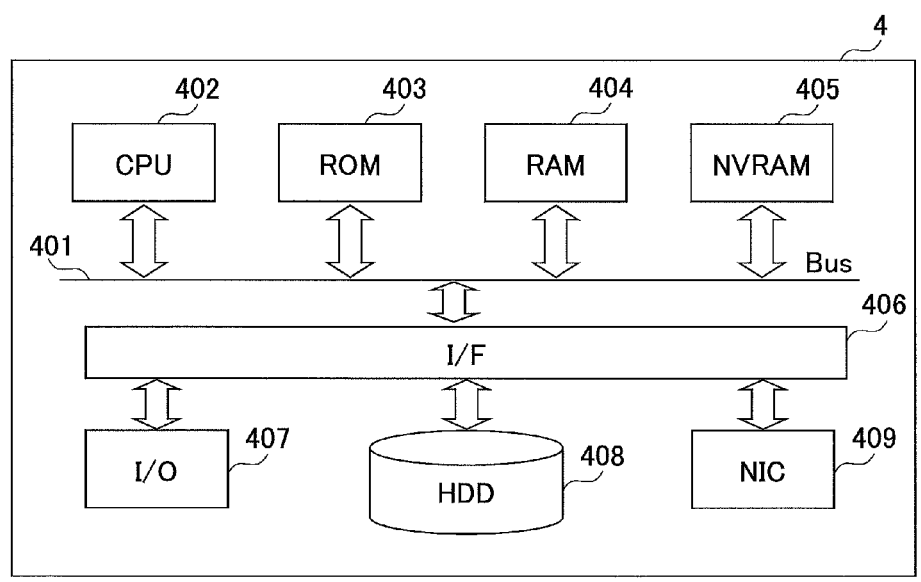
FIG. 3 is a block diagram illustrating an example of a hardware structure of a game control server apparatus of the embodiment.

FIG. 3 is a block diagram illustrating an example of a hardware structure of the game control server apparatus 4 of the embodiment.

The game control server apparatus 4 includes a CPU (Central Processing Unit) 402, a ROM (Read Only Memory) 403, a RAM (Random Access Memory) 404, an NVRAM (Non-Volatile Random Access Memory) 405 and an I/F (Interface) 406 connected to a system bus 401, an I/O (Input/Output Device) 407 for a keyboard, a mouse, a monitor, a CD/DVD (Compact Disk/Digital Versatile Disk) drive or the like, an HDD (Hard Disk. Drive) 408 and an NIC (Network Interface Card) 409 connected to the I/F 406 and the like.

Figure 4:
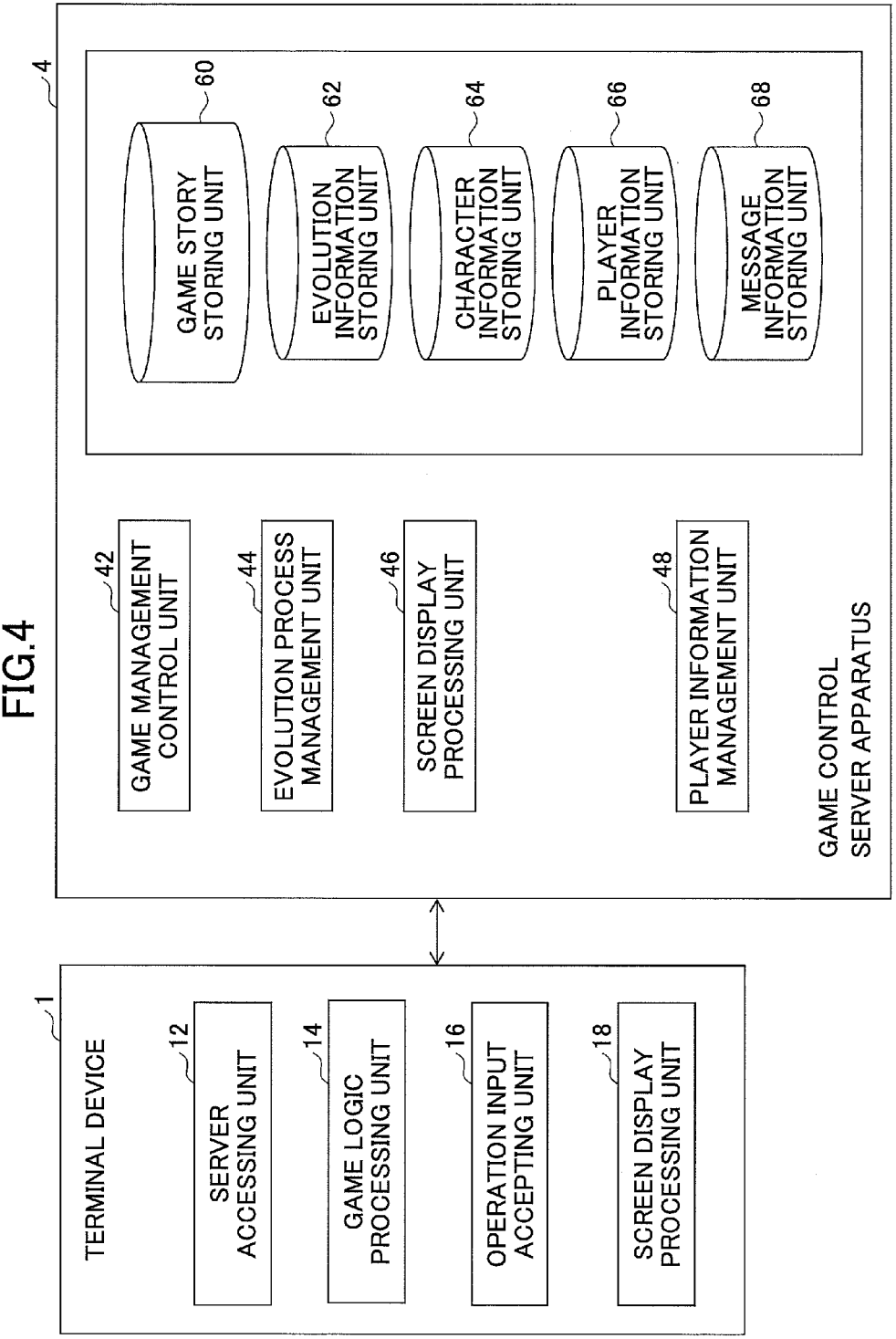
FIG. 4 is a block diagram illustrating an example of functional structures of the terminal device and the game control server apparatus of the embodiment.

FIG. 4 is a block diagram illustrating an example of functional structures of the terminal device 1 and the game control server apparatus 4.

The terminal device 1 includes a server accessing unit 12, a game logic processing unit 14, an operation input accepting unit 16 and a screen display processing unit 18.

The operation input accepting unit 16 accepts an operation input from a player (user) who operates the terminal device 1.

The game logic processing unit 14 process a game by transitioning screens in accordance with an input operation of the player accepted by the operation input accepting unit 16.

The server accessing unit 12 sends a request to the game control server apparatus 4 and receives a processed result or the like as a response from the game control server apparatus 4 when it is necessary to access the game control server apparatus 4 in a course of the processing by the game logic processing unit 14.

The screen display processing unit 18 displays screens under control of the game logic processing unit 14.

The game control server apparatus 4 includes a game management control unit 42, an evolution process management unit 44, a screen display processing unit 46, a player information management unit 48, a game story storing unit 60, an evolution information storing unit 62, a character information storing unit 64, a player information storing unit 66 and a message information storing unit 68.

The game story storing unit 60 stores a game story or the like for performing the game of the embodiment.

The game management control unit 42 controls the entirety of the game control server apparatus 4. The game management control unit 42, based on a request from the terminal device 1, processes a process along with the game story by referring to the game story storing unit 60, and sends a processed result of the request to the terminal device 1 as a response, for example.

In the game targeted in this embodiment, for example, when each of the players operates a character such as its own player character, a monster or the like to perform an action such as questing, attacking, defeating a boss character or the like in a game space, the player may obtain points. Then, the status of the player or an experience value of the character may be increased in accordance with the obtained points.

In a game configured such, a player can convert a character possessed by the player to an evolved character by combining the original character with another character or the like at a predetermined timing. The evolved character may be, for example, a character whose parameter value such as an upper limitation value of level of the like is higher than that of the original character. Hereinafter, a character to be evolved is referred to as a "base character", another character to be combined with the base character is referred to as a "partner character" and a character obtained by evolving the base character is referred to as an "evolved character".

Further, in this embodiment, when evolving a base character, a player may use a partner character possessed by the player, or alternatively, may borrow a partner character possessed by another player. Here, it may be configured such that when the player uses the partner character possessed by the player, the partner character disappears, however, when the player uses the partner character possessed by another player, the partner character does not disappear. With this configuration, incentive to use the partner character of the other player can be increased and communication between players can be activated.

Further, in this embodiment, it is assumed that a player can only borrow a partner character from a friend player who is registered as a friend of the player in the game. With this configuration, players are accelerated to make a friend player in the game.

The player information storing unit 66 stores various player information of all of the players who participate in the game. In this embodiment, the player information storing unit 66 stores information of characters possessed by the player in corresponded with the player, for each of the plurality of players. The player information management unit 48 manages updating, referring or the like of the player information stored in the player information storing unit 66.

FIG. 5 is a view illustrating an example of an internal structure of the player information storing unit 66 of the embodiment. The player information storing unit 66 includes items (fields) such as "player ID", "status", "icon data", "player name", "currency in game", "friend player ID", "possessing character ID", "possessing item ID" or the like.

The "player ID" is data to specify (identify) the player. The "status" indicates the status of the player in a progression of the game. The "icon data" is data to specify a display icon of the player. The "player name" is data for display name of the player. The "currency in game" indicates currency possessed by the player that can be used in the game. The "friend player ID" is data to specify another player that is associated with the player as a friend player.

The "possessing character ID" is data regarding characters possessed by the player. The "possessing item ID" is data regarding items possessed by the player. Although not illustrated in FIG. 5, the player information storing unit 66 may further store an experience value such as a current level, used period, winning percentage in a battle or the like of the respective character or the item in correspondence with each of the character IDs or the item IDs stored in a "possessing character ID" or "possessing item ID" box, respectively.

Referring back to FIG. 4, the character information storing unit 64 stores various character information of all of the characters that appear in the game.

FIG. 6 is a view illustrating an example of an internal structure of the character information storing unit 64 of the embodiment. The character information storing unit 64 includes items (fields) such as "character ID", "icon data", "character name", "upper limitation value of level", "rare degree" or the like.

The "character ID" is data to specify the character. The "icon data" is data to specify a display icon of the character. The "character name" is data for display name of the character.

The "rare degree" is data indicating frequency of appearance of the character in the game. It is assumed that the higher the rare degree is, the lower the frequency of appearance is.

Referring back to FIG. 4, the evolution information storing unit 62 stores a base character, a partner character and an evolved character associated with each other. Here, the base character is an object to be evolved. The partner character is combined with the base character to convert the base character to the evolved character.

FIG. 7 is a view illustrating an example of an internal structure of the evolution information storing unit 62 of the embodiment. The evolution information storing unit 62 includes items (fields) such as "base character ID", "partner character", "evolved character ID", or the like. The "base character ID" is data to specify a base character that is an object to be evolved.

The "partner character" is data regarding a partner character combinable with the base character. The "partner character" includes items (fields) such as "ID (hereinafter, referred to as "partner character ID")", "necessary currency in game" or the like. The "partner character ID" is data to specify the partner character.

The "necessary currency in game" is data indicating currency in game (reward) necessary for the player to pay for a friend player when the player borrows the partner character from the friend player. For example, the necessary currency in game may be set higher as the rare degree of the partner character becomes higher. Further, as another example, instead of setting the necessary currency in game for each of the partner characters, the necessary currency in game may be uniformly set for all of the partner characters when borrowing the partner character.

The "evolved character ID" is data to specify the evolved character that is generated when corresponding base character and partner character are combined.

For example, a base character with base character ID "BS001" is evolved to a character with evolved character ID "EV010", "EV011" or the like by being combined with a partner character with partner character ID "PC010", "PC011" or the like, respectively.

Further, when the player evolves the base character with the base character ID "BS001", if the player borrows the partner character with the partner character ID "PC010" from the friend player, currency in game "20" is necessary, and if the player borrows the partner character with the partner character ID "PC011" from the friend player, currency in game "40" is necessary.

Referring back to FIG. 4, the evolution process management unit 44 controls an evolution process of a base character. The evolution process management unit 44 manages updating, referring or the like of the information stored in the player information storing unit 66 via the player information management unit 48. The evolution process management unit 44 also manages updating, referring or the like of the information stored in the evolution information storing unit 62 and the character information storing unit 64.

Specifically, the evolution process management unit 44 converts a base character to a corresponding evolved character based on an evolution instruction of the base character of combining the base character and a partner character from a first player. Here, it is necessary for the first player to possess the base character, however, in this embodiment, as described above, the partner character may be one possessed by the first player or may be one possessed by a friend player of the first player.

When the partner character is the one possessed by the first player, the evolution process management unit 44 converts the base character to an evolved character that is associated with the base character and the partner character. Further, the evolution process management unit 44 deletes information of the partner character in the possessing character ID box of the player information storing unit 66 for the first player.

On the other hand, when the partner character is the one possessed by the friend player of the first player, the evolution process management unit 44 performs a process of giving a reward from the first player to the friend player and then converts the base character to the evolved character associated with the base character and the partner character, using the partner character of the friend player. In this case, the evolution process management unit 44 remains that the partner character is possessed by the friend player. Here, in this embodiment, an example is explained in which currency in game is paid to the friend player as a reward when the first player borrows the partner character of the friend player. Alternatively, the reward may be an item or the like obtained in the game other than the currency in game, for example.

In other words, when the base character of the first player is converted to the evolved character using the partner character of the friend player, the evolution process management unit 44 does not delete the information of the partner character in the possessing character ID box of the player information storing unit 66 for the friend player and remains as it is.

Further, when the base character is converted to the evolved character, in any cases, the evolution process management unit 44 deletes information of the base character in the possessing character ID box of the player information storing unit 66 for the first player and adds information of the new evolved character in the possessing character ID box of the player information storing unit 66 for the first player.

The screen display processing unit 46 displays, under control of the evolution process management unit 44, an evolution process screen for evolving a base character. The evolution process management unit 44 controls the screen display processing unit 46 to display various information.

Further, when the player uses the partner character of the friend player, the evolution process management unit 44 may send a message to the friend player. The content of the message may be arbitrarily input by the player, or a predetermined fixed phrase may be automatically sent. The message information storing unit 68 stores such a fixed phrase or the like. The message may be sent to a message box in the game, or may be sent by chat, e-mail, SMS, pop-up or the like. With this configuration, communication between players can be activated.

Figure 8:
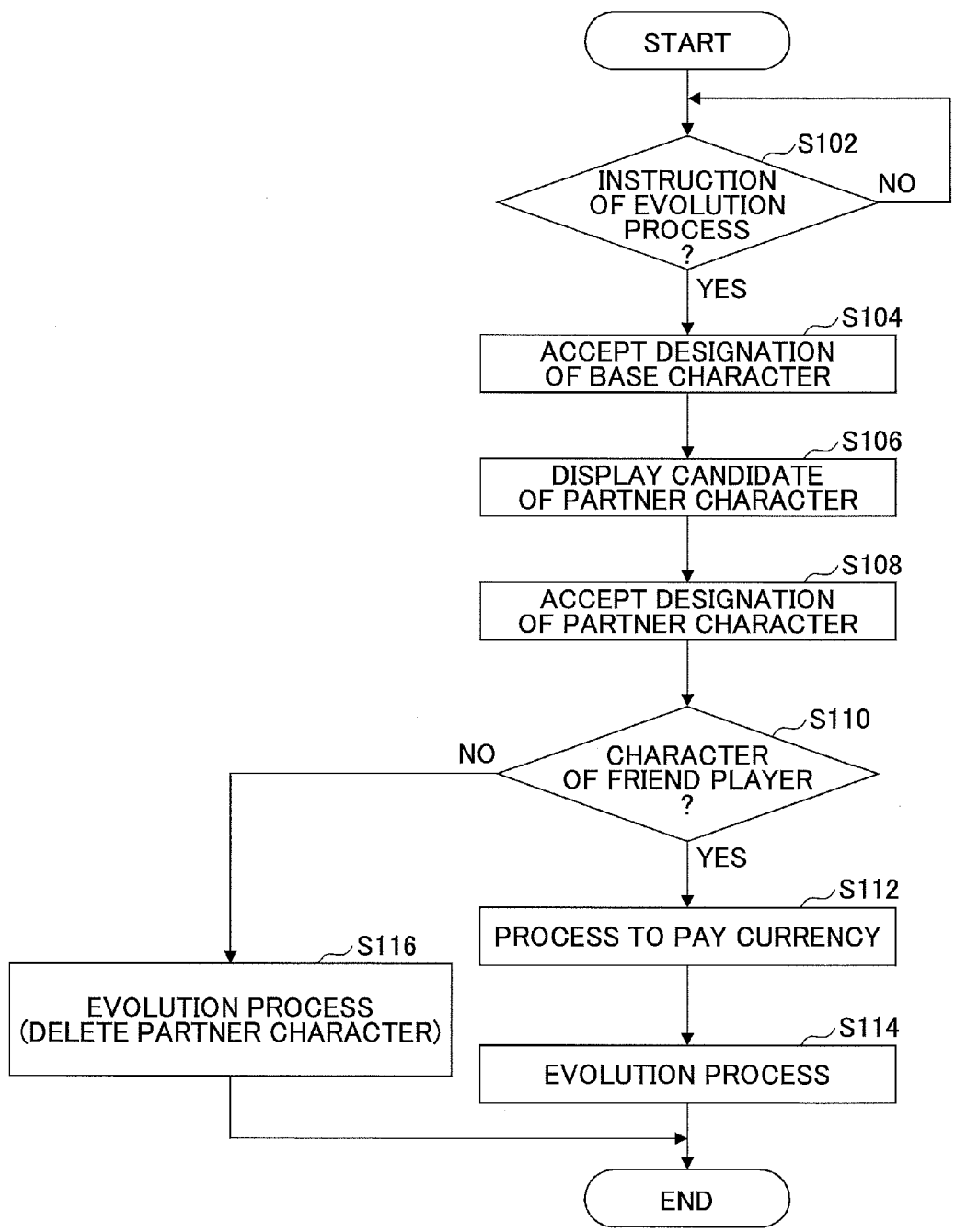
FIG. 8 is a flowchart illustrating an example of processing steps of the game control server apparatus of the embodiment.

FIG. 8 is a flowchart illustrating an example of processing steps of the game control server apparatus of the embodiment. FIG. 8 illustrates processing steps of the game control server apparatus 4 when the game control server apparatus 4 performs an evolution process of a character in the game in this embodiment.

When an instruction of an evolution process is accepted from the first player (YES in step S102), the evolution process management unit 44 accepts designation of a base character, that is an object to be evolved (step S104).

The base character may be designated by a system side, or alternatively, may be designated by the first player by inputting base character ID or the like. Further, a list or the like of base characters capable of being designated may be presented to the first player and the first player may be advised to select the base character to evolve from the list. In this case, the evolution process management unit 44 extracts characters capable of being designated as a base character from the characters possessed by the first player by referring to the player information storing unit 66. Then, the screen display processing unit 46 displays the list or the like of the characters capable of being designated as a base character on the terminal device 1 of the first player. When the first player designates a base character to be evolved from the list or the like, the evolution process management unit 44 accepts it as the designation of the base character.

Subsequently, the evolution process management unit 44 obtains information of partner characters combinable with the base character designated in step S104 by referring to the evolution information storing unit 62. Then, the screen display processing unit 46 displays the information of the partner character obtained by the evolution process management unit 44 on the terminal device 1 of the first player (step S106). Here, when a plurality of partner characters are combinable with the base character, the plurality of partner characters are displayed.

At this time, the evolution process management unit 44 determines whether the first player possesses a partner character combinable with the base character by referring to the player information storing unit 66. When the first player possesses a partner character combinable with the base character, the screen display processing unit 46 displays that information on the terminal device 1 of the first player as well.

Further, the evolution process management unit 44 may determine whether a friend player of the first player possesses a partner character combinable with the base character by referring to the player information storing unit 66. At this time, when the friend player of the first player possesses a partner character combinable with the base character, the screen display processing unit 46 displays that information on the terminal device 1 of the first player as well.

Figure 9:
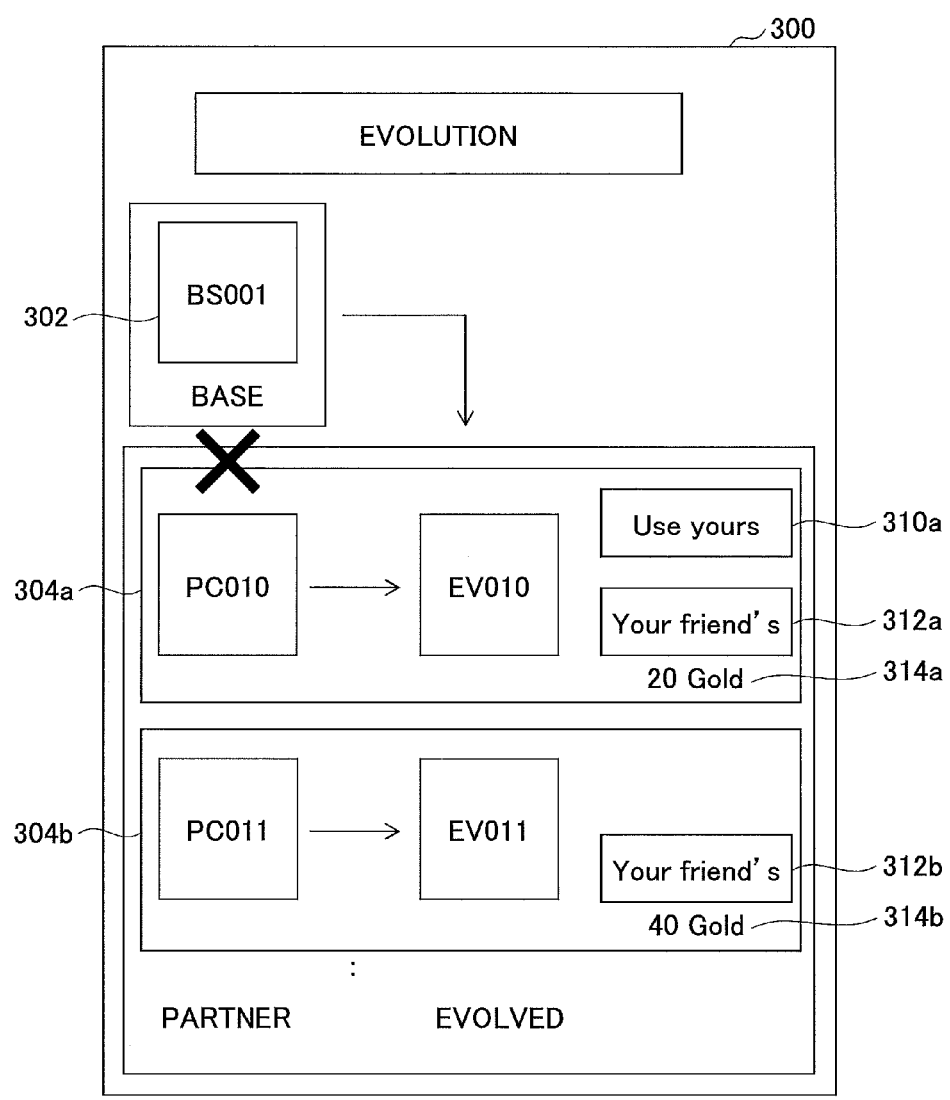
FIG. 9 is a view illustrating an example of an evolution process screen of the embodiment.

FIG. 9 is a view illustrating an example of an evolution process screen 300 that is displayed on the terminal device 1 of the first player when the first player designates a base character and a partner character.

The evolution process screen 300 includes a base character designating area 302. In the evolution process screen 300 configured as such, when the first player taps the base character designating area 302, a list or the like of characters that can be designated as a base character is displayed. When the first player designates a base character from the list or the like, the screen display processing unit 46 displays an icon or the like of the designated base character in the base character designating area 302. Here, an icon or the like of a base character with base character ID "BS001" is displayed in the base character designating area 302.

Further, the screen display processing unit 46 displays partner characters combinable with the base character and corresponding evolved characters in partner character designating areas 304a and 304b or the like. Here, icons or the like of a partner character with partner character ID "PC010" and an evolved character with evolved character ID "EV010" are displayed in the partner character designating area 304a. Similarly, icons of a partner character with partner character ID "PC011" and an evolved character with evolved character ID "EV011" are displayed in the partner character designating area 304b.

Further, when the first player possesses the partner character with the partner character ID "PC010", for example, the screen display processing unit 46 displays a use your item button 310a in the partner character designating area 304a. When the first player selects the use your item button 310a, the screen display processing unit 46 displays a message such as "Do you want to use your partner character? The partner character will disappear after evolution." or the like. Then, when the first player confirms by "YES" or the like, the character of the first player with the partner character ID "PC010" is designated.

Further, when a friend player of the first player possesses the partner character with the partner character ID "PC010", for example, the screen display processing unit 46 displays a use friend's button 312a and a necessary currency 314a that indicates the currency in game necessary to pay when the first player borrows the partner character from the friend player, in the partner character designating area 304a.

When the first player selects the use friend's button 312a, the screen display processing unit 46 displays a message such as "Do you want to use xx's partner character? You need to pay 20 Gold." or the like. Then, when the first player confirms by "YES" or the like, the character of this friend player with the partner character ID "PC010" is designated. When the friend player of the first player possesses the partner character with the partner character ID "PC011", for example, similarly, a use friend's button 312b and a necessary currency 314b are displayed in the partner character designating area 304b.

Here, when a plurality of friend players possess the corresponding partner character, a list of the friend players may be displayed and the first player may select which player's partner character to use.

Referring back to FIG. 8, upon accepting designation of a partner character that is used in evolution from the first player (step S108), the evolution process management unit 44 determines whether the partner character is possessed by the friend player of the first player (step S110).

When the partner character is possessed by the first player (NO in step S110), the evolution process management unit 44 performs an evolution process of the base character designated in step S104 and the partner character (step S116). At this time, the evolution process management unit 44 deletes the information of the base character and the partner character that are used in the evolution from the possessing character ID box for the first player and adds the information of the evolved character in the possessing character ID box for the first player, in the player information storing unit 66.

On the other hand, when the partner character is possessed by the friend player (YES in step S110), the evolution process management unit 44 performs a process to pay the currency in game associated with the partner character from the first player to the friend player (step S112). Thereafter, the evolution process management unit 44 performs the evolution process of the base character designated in step S104 and the partner character (step S114).

At this time, the evolution process management unit 44 deletes the information of the base character among the base character and the partner character that are used in the evolution from the possessing character ID box for the first player and adds the information of the evolved character in the possessing character ID box for the first player, in the player information storing unit 66. Here, the information of the partner character of the friend player of the first player that is used in the evolution is remained in the possessing character ID box for the friend player in the player information storing unit 66.

OTHER EXAMPLES

As another example, the evolution process management unit 44 may determine whether the friend players of the first player possess a partner character combinable with the base character by referring to the player information storing unit 66, after accepting an instruction to search the friend players who possess the partner character from the first player.

Figure 10:
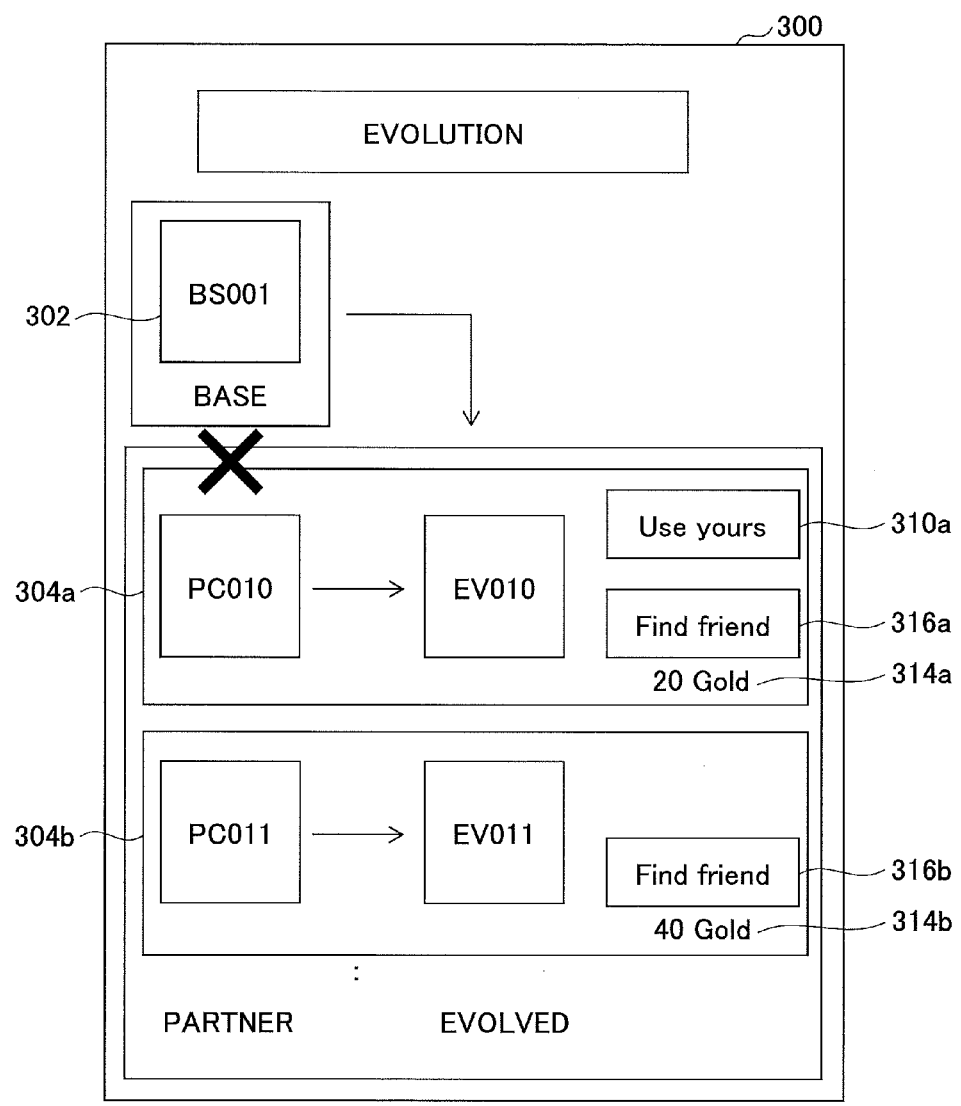
FIG. 10 is a view illustrating another example of the evolution process screen of the embodiment.

FIG. 10 is a view illustrating another example of the evolution process screen 300 that is displayed on the terminal device 1 of the first player when the first player designates the base character and the partner character.

The screen display processing unit 46 displays friend search buttons 316a and 316b for searching friend players who possess the corresponding partner character in the partner character designating areas 304a and 304b, instead of the use friend's buttons 312a and 312b illustrated in FIG. 9, respectively.

When the first player selects the friend search button 316a of the evolution process screen 300, the evolution process management unit 44 determines whether the friend players of the first player possess the partner character with the partner character ID "PC010" by referring to the player information storing unit 66. When the friend players of the first player possess the partner character with the partner character ID "PC010", the screen display processing unit 46 displays a list or the like of the friend players who possess the partner character with the partner character ID "PC010" on the terminal device 1 of the first player. The first player may designate a friend player from whom the first player borrows the partner character from the list or the like.

Further, as another example, the evolution process management unit 44 may be configured, under a status that a base character to evolve is designated by the first player, to accept input of ID of a friend player or the like whom the first player borrows a partner character to combine with the base character from the first player, and control the screen display processing unit 46 to display the list or the like of the partner characters possessed by the friend player on the terminal device 1 of the first player.

Figure 11:
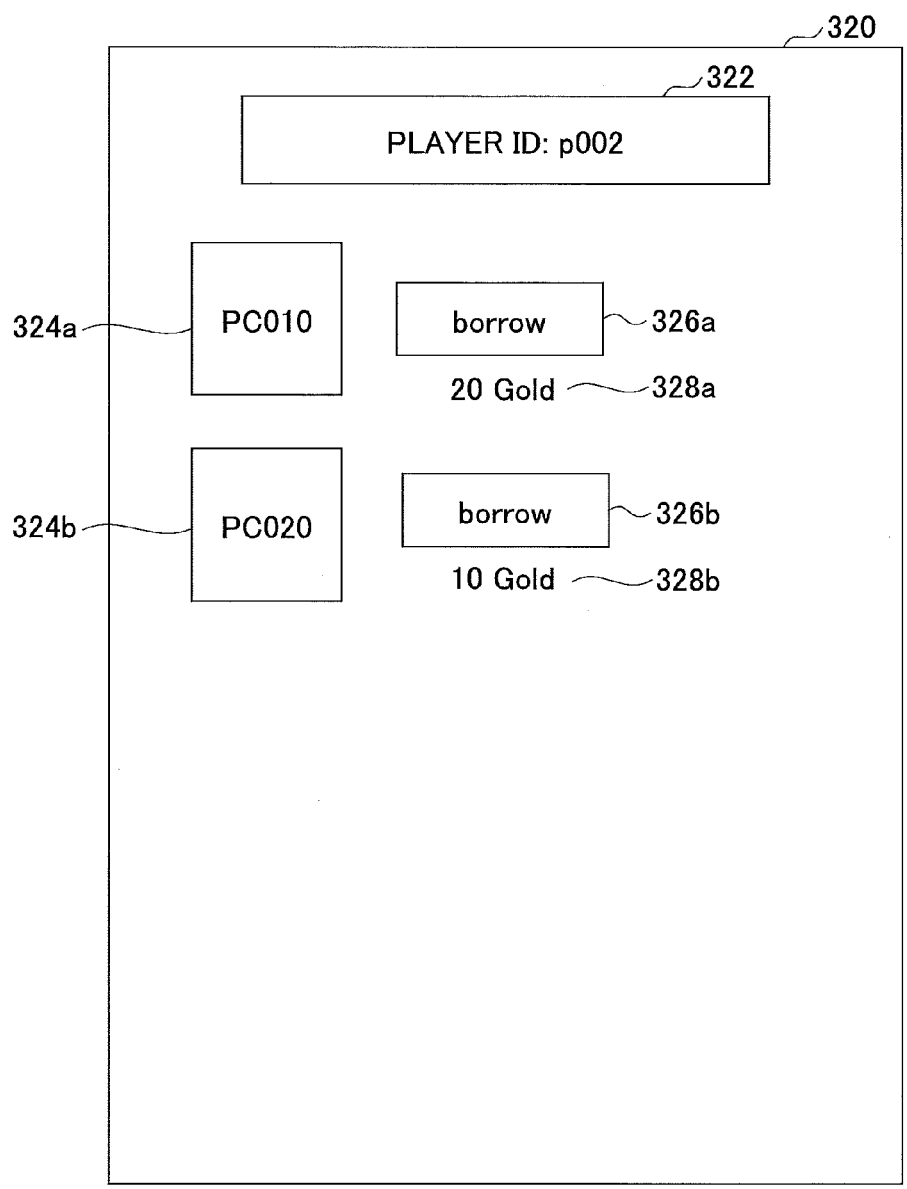
FIG. 11 is a view illustrating another example of the evolution process screen of the embodiment.

FIG. 11 is a view illustrating an example of an evolution process screen 320 displayed on the terminal device 1 of the first player when the first player designates the partner character possessed by the friend player.

For example, when the first player designates a player with player ID "p0002" as a friend player to borrow the partner character after designating the base character with the base character ID "BS001", the screen display processing unit 46 displays partner characters possessed by the player with the player ID "p0002", among the partner characters combinable with the base character, at partner character display areas 324a and 324b or the like. Further, the screen display processing unit 46 displays borrow buttons 326a and 326b, and necessary currencies 328a and 328b to correspond to the partner character display areas 324a and 324b, respectively.

When the first player selects the borrow button 326a, the screen display processing unit 46 displays a message such as "Do you want to use a partner character of player ID p002? You need to pay 20 Gold." or the like. Then, when the first player confirms by such as "YES" or the like, the partner character with the partner character ID "PC010" of the friend player is designated.

Further, as another example, the evolution process management unit 44 may be configured to control the screen display processing unit 46 to display a list of partner characters possessed by each of the players to a friend player. For example, when the first player visits a site of the friend player such as a my-page or the like under a status that a base character to evolve is designated by the first player, a site such as "possessing partner character list" or the like may be provided to be displayable. Then, when the first player selects to visit the site, the evolution process screen 320 as illustrated in FIG. 11 may be displayed.

Further, as another example, under a status that a base character to evolve is designated by the first player, when another player other than the friend players of the first player possesses a partner character combinable with the base character, the evolution process management unit 44 may be configured to control the screen display processing unit 46 to display the fact with information of the other player. With this configuration, the first player is capable of taking measures such as applying the other player who possesses the partner character to be a friend player, then becoming a friend player of the other player or the like. With this configuration, players are accelerated to make a friend player in the game.

Further, as another example, under a status that a base character to evolve is designated by the first player, even when the first player and the friend players of the first player do not possess the partner character combinable with the base character, the evolution process management unit 44 may be configured to control the screen display processing unit 46 to display the partner character combinable with the base character. With this configuration, the first player is capable of taking measures such as asking other players to find a player who possesses the partner character using a bulletin board system or the like, becoming a new friend player of the player or the like. With this configuration, players are accelerated to make a friend player in the game.

As described above, according to the embodiment, as it is possible to use a partner character possessed by a friend player when evolving a base character, the player can evolve the base character without obtaining the partner character by the player itself. Thus, degree of freedom in the game can be increased.

Further, as a possibility to use necessary partner characters can be increased by increasing friend players, incentive to make a lot of friend players can be increased. Thus, communication between players can be activated.

According to the embodiment, a technique in which flexibility is increased when converting a character by combining with another character and communication between players can be activated can be provided.

The individual constituents of the terminal device 1 and the game control server apparatus 4 illustrated in FIG. 4 indicate not a structure of hardware units but blocks of functional units. The individual constituents of the terminal device 1 and the game control server apparatus 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications. Further, the functions performed by the game control server apparatus 4 are not necessarily performed in a single apparatus and may be dispersed in a plurality of apparatuses.

Although a preferred embodiment of the game control server apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, in this embodiment, it may be configured that only a character whose experience value such as a current level, used period, winning percentage in a battle or the like satisfies a predetermined condition is capable of being designated, not allowing all of the characters to be designated. The predetermined condition may be, for example, that the current level of the character is greater than or equal to a predetermined value, that the used period of the character is greater than or equal to a predetermined period, the winning percentage in a battle of the character is greater than or equal to a predetermined value or the like. Such conditions may be stored in the evolution information storing unit 62. The evolution process management unit 44 may determine whether the character of each of the players can become a base character that is an object to be evolved by referring to the evolution information storing unit 62 and the player information storing unit 66.

Further, for example, the evolution information storing unit 62 may store different partner characters or different evolved characters depending on experience values of a base character for the same base character. The different partner characters or the different evolved characters may be characters whose upper limitation values of level are different, for example. The different partner characters or the different evolved characters may be characters of different kinds, characters of the same kind but only the upper limitation values of level are different. In the following, examples in which winning percentage in a battle is used as the experience value are explained. FIG. 12 to FIG. 14 are views illustrating another example of the internal structure of the evolution information storing unit 62 of the embodiment.

FIG. 12 illustrates an example in which the base character and the partner character to be combined are the same, but depending on a winning percentage of the base character, the base character with a higher winning percentage is converted to an evolved character with a higher upper limitation value of level. The evolution information storing unit 62 stores different evolved characters for different ranges of winning percentage in a battle of the base character.

For example, when combining a base character "BS001" and a partner character "PC010", when the winning percentage of the base character "BS001" is less than 30%, the base character "BS001" is converted to an evolved character "EV010". Meanwhile, when the winning percentage of the base character "BS001" is greater than or equal to 30%, the base character "BS001" is converted to an evolved character "EV011" whose upper limitation value of level is higher than that of the evolved character "EV010".

FIG. 13 illustrates an example in which the base character and the evolved character are the same, but depending on the winning percentage of the base character, it is necessary for the base character whose winning percentage is lower to be combined with a partner character whose upper limitation value of level is higher. The evolution information storing unit 62 stores different partner characters for different ranges of winning percentage in a battle of the base character.

For example, when converting the base character "BS001" to the evolved character "EV010", if the winning percentage of the base character "BS001" is greater than or equal to 30%, it is possible to combine with the partner character "PC010". Meanwhile, if the winning percentage of the base character "BS001" is less than 30%, it is necessary to combine with the partner character "PC011" whose upper limitation value of level is higher than that of the partner character "PC010". Further, the necessary currency in game when borrowing the partner character from a friend player may be set higher for the partner character "PC011" whose upper limitation value of level is higher.

FIG. 14 illustrates an example in which, depending on the experience value of the base character, upper limitation values of level of the partner character and the evolved character are different. The evolution information storing unit 62 stores different partner characters and evolved characters for different ranges of winning percentage in a battle of the base character.

Further, for example, the evolution information storing unit 62 may store, depending on the experience value of the partner character, different base characters or different evolved characters. The different base characters or the different evolved characters may be characters whose upper limitation values of level are different, for example. The different base characters or the different evolved characters may be characters of different kinds, characters of the same kind but only the upper limitation values of level are different. In the following, examples in which winning percentage in a battle is used as the experience value are explained.

FIG. 15 is a view illustrating is a view illustrating another example of the internal structure of the evolution information storing unit 62 of the embodiment. FIG. 15 illustrates an example in which the base character and the partner character to combine are the same, but depending on the winning percentage of the partner character, the base character is changed to an evolved character with a higher upper limitation value of level when the winning percentage of the partner character is higher.

For example, even when the base character "BS001" and the partner character "PC010" are combined, if the winning percentage of the partner character "PC010" is less than 30%, the base character "BS001" is converted to an evolved character "EV010". Meanwhile, if the winning percentage of the partner character "PC010" is greater than or equal to 30%, the base character "BS001" is converted to an evolved character "EV011" whose upper limitation value of level is higher than that of the evolved character "EV010". Here, the necessary currency in game may be set different depending on the winning percentage even for the same partner character.

With this configuration, incentive for the player to borrow the partner character from other players even when the player possesses the partner character because it is possible to convert the base character to the evolved character with a higher parameter value by borrowing the partner character with a higher experience value of the other player. Thus, communication between players can be activated.

Further, for example, it may be configured that a plurality of partner characters are necessary when evolving a base character. Further, it may be configured that a player necessarily borrows (uses) a character of friend players when evolving a base character. Further, it may be configured that two or more partner characters of friend players are necessary when evolving a base character. These may be set in the evolution information storing unit 62.

Further, for example, it may be configured that an evolution material such as an accessory like an arm, a guard or the like, an item like a game card or the like is necessary in addition to a partner character when evolving a base character. FIG. 16 is a view illustrating another example of an internal structure of the evolution information storing unit 62 of the embodiment. The evolution information storing unit 62 further includes an item "evolution material ID" in addition to the items illustrated in FIG. 7. The "evolution material ID" is data to specify the evolution material.

In this example, for example, a base character with base character ID "BS001" is evolved to a character with evolved character ID "EV010" by combining a partner character with partner character ID "PC010" and an evolution material with evolution material ID "item 1" with the base character ID "BS001".

Further, for a partner character used by other players, the fact that the partner character is used by the other player may be accumulated as an experience value to the partner character, or the number that the partner character is capable of being used by other players may be limited.

Further, the game may be performed by any of a "browser type" and an "application type". In the browser type, screen transition data (View data) that describes a display control content of a series of screens in accordance with the game progression is managed at the game control server apparatus 4 side, data such as an HTML data document, images corresponded to the HTML data document or the like are sent to the terminal device in response to a request of obtaining data by an input operation from the terminal device 1, and the data are displayed in the web browser on the terminal device 1. Meanwhile, in the application type, game application software (application program) is previously downloaded to the terminal device 1 from the game control server apparatus 4 or the like, the game application software is executed on the terminal device 1, and screen data is generated to be displayed based on screen transition data included in the game application software that is stored in the terminal device 1 after being downloaded and data obtained from the server by an input operation as a trigger.

What is claimed is:

1. A game control server apparatus connected to a plurality of terminal devices of a plurality of players via a network, comprising:
   a player information storing unit that stores information of characters possessed by each of the players;
   an evolution information storing unit that stores a base character, a partner character and an evolved character associated with each other,
   the base character being converted to the evolved character by combining the base character and the partner character; and
   an evolution process management unit that
      transmits, to a first terminal device of a first player, an evolution process screen to be displayed on the first terminal device,
      the evolution process screen including
         first information regarding a base character possessed by the first player and
         second information regarding a combination of a partner character that is associated with the base character and another player who possesses the partner character,
      accepts, from the first terminal device of the first player, an evolution instruction of the base character with designation of the combination of the partner character and the player included in the evolution process screen, and
      converts, upon accepting the evolution instruction of the base character possessed by the first player by combining the base character and the partner character possessed by another second player to evolve the base character from the first terminal of the first player, the base character to an evolved character that is associated with the base character and the partner character using the partner character of the second player under a condition that a process of paying reward from the first player to the second player is performed.

2. The game control server apparatus according to claim 1, wherein the evolution information storing unit stores reward that is necessary in order to use the partner character in correspondence with each of the partner characters.

3. The game control server apparatus according to claim 1, wherein the evolution process screen further including a third information regarding a combination of a partner character that is associated with the base character and possessed by the first player,
wherein the evolution process management unit converts, upon accepting an evolution instruction of a base character possessed by the first player by combining the base character and a partner character possessed by the first player to evolve the base character from the first terminal device of the first player, the base character to an evolved character associated with the base character and the partner character, and deletes information of the character used as the partner character among information of characters possessed by the first player in the player information storing unit,
wherein when the base character of the first player is converted to the evolved character using the partner character of the second player, the evolution process management unit remains the partner character to be possessed by the second player.

4. The game control server apparatus according to claim 1, wherein the evolution process management unit extracts, upon accepting an evolution process instruction of a base character of the first player from the first terminal device of the first player, by referring to the evolution information storing unit and the player information storing unit, a partner character that is associated with the base character and information of another player who possesses the partner character and performs a process of presenting them to the first player by incorporating them in the evolution process screen.

5. The game control server apparatus according to claim 1, wherein the evolution process management unit transmits, under a status that a base character of the first player and a partner character to combine with the base character are designated, upon receiving an instruction to search another player who possesses the partner character from the first terminal device of the first player, by referring to the player information storing unit, information of another player who possesses the partner character to the first terminal device of the first player to be displayed on the first terminal.

6. The game control server apparatus according to claim 1, wherein the evolution process management unit extracts, under a status that a base character of the first player is designated, upon accepting an input of information identifying another player from the first terminal device of the first player, by referring to the evolution information storing unit and the player information storing unit, information of the partner character associated with the base character among characters possessed by the other player and transmits the extracted information to the first terminal device of the first player to be displayed on the first terminal.

7. The game control server apparatus according to claim 1, wherein the player information storing unit stores, for each of the plurality of players, information indicating friend players of the respective player, and
wherein the evolution process management unit permits the first player to use the partner character possessed by the second player when the second player is the friend player of the first player.

8. The game control server apparatus according to claim 1, wherein the evolution information storing unit stores different partner characters or different evolved characters for different ranges of an experience value of the base character.

9. The game control server apparatus according to claim 1, wherein the evolution information storing unit stores different base characters or different evolved characters for different ranges of an experience value of the partner character.

10. The game control server apparatus according to claim 1,
wherein the evolution process management unit further transmits, to a second terminal device of the second player, a message from the first player, when the partner character of the second player is used to convert the base character to the evolved character.

11. A non-transitory computer-readable recording medium having recorded thereon a program for a game control apparatus including a computer and connected to a plurality of terminal devices of a plurality of players via a network,
the game control apparatus including
a player information storing unit that stores information of characters possessed by each of the players, and
an evolution information storing unit that stores a base character, a partner character and an evolved character associated with each other,
the base character being converted to the evolved character by combining the base character and the partner character,
the program causing the computer to execute an evolution process management function that
transmits, to a first terminal device of a first player, an evolution process screen to be displayed on the first terminal device,
the evolution process screen including
first information regarding a base character possessed by the first player and
second information regarding a combination of a partner character that is associated with the base character and another player who possesses the partner character,
accepts, from the first terminal device of the first player, an evolution instruction of the base character with designation of the combination of the partner character and the player included in the evolution process screen, and
converts, upon accepting the evolution instruction of the base character possessed by the first player by combining the base character and the partner character possessed by another second player to evolve the base character from the first terminal of the first player, the base character to an evolved character that is associated with the base character and the partner character using the partner character of the second player under a condition that a process of paying reward from the first player to the second player is performed.

12. The non-transitory computer-readable recording medium according to claim 11,
wherein the evolution process management function extracts, upon accepting an evolution process instruction of a base character of the first player from the first terminal device of the first player, by referring to the evolution information storing unit and the player information storing unit, a partner character that is associated with the base character and information of another player who possesses the partner character and performs a process of presenting them to the first player by incorporating them in the evolution process screen.

13. The non-transitory computer-readable recording medium according to claim 11,
wherein the evolution process management function transmits, under a status that a base character of the first player and a partner character to combine with the base character are designated, upon receiving an instruction to search another player who possesses the partner character from the first terminal device of the first player, by referring to the player information storing unit, information of another player who possesses the partner character to the first terminal device of the first player to be displayed on the first terminal.

14. The non-transitory computer-readable recording medium according to claim 11,
wherein the evolution process management function extracts, under a status that a base character of the first player is designated, upon accepting an input of information identifying another player from the first terminal device of the first player, by referring to the evolution information storing unit and the player information storing unit, information of the partner character associated with the base character among characters possessed by the other player and transmits the extracted information to the first terminal device of the first player to be displayed on the first terminal.

15. The non-transitory computer-readable recording medium according to claim 11,
wherein the player information storing unit stores, for each of the plurality of players, information indicating friend players of the respective player, and
wherein the evolution process management function permits the first player to use the partner character possessed by the second player when the second player is the friend player of the first player.

16. The non-transitory computer-readable recording medium according to claim 11,
wherein the evolution information storing unit stores different partner characters or different evolved characters for different ranges of an experience value of the base character.

17. The non-transitory computer-readable recording medium according to claim 11,
wherein the evolution process management function further transmits, to a second terminal device of the second player, a message from the first player, when the partner character of the second player is used to convert the base character to the evolved character.

* * * * *